United States Patent [19]
Boll et al.

[11] Patent Number: 4,526,427
[45] Date of Patent: Jul. 2, 1985

[54] APPARATUS FOR FASTENING INSTRUMENTS IN A FRONT PANEL OR SWITCHBOARD

[76] Inventors: Rudi Boll, Im Wolfsgrund 27C, 7826 Schluchsee; Arno Tetzlaff, An der Haslach 7, 7825 Lenzkirch; Gerhard Steidle, Bogenstrasse 1, 7737 Bad Dürrheim 4, all of Fed. Rep. of Germany

[21] Appl. No.: 486,351

[22] Filed: Apr. 19, 1983

[30] Foreign Application Priority Data

Apr. 20, 1982 [DE] Fed. Rep. of Germany ....... 3214528

[51] Int. Cl.³ .............................................. F16B 12/00
[52] U.S. Cl. .................................. 312/111; 248/27.1; 312/242; 312/263; 403/405
[58] Field of Search ............... 312/111, 140, 242, 245, 312/246, 263, 107; 108/64; 248/27.1; 403/405, 408

[56] References Cited

U.S. PATENT DOCUMENTS

| 639,337 | 12/1899 | Anthony | 403/405 |
|---|---|---|---|
| 846,881 | 3/1907 | Walton | 312/107 |
| 3,446,467 | 5/1969 | Bailey et al. | 248/27.1 |
| 3,504,876 | 4/1970 | Swanson | 248/27.1 |
| 3,751,127 | 8/1973 | Black, Jr. et al. | 312/111 |
| 3,836,218 | 9/1974 | Hallal | 312/111 |
| 3,903,458 | 9/1975 | Arnoux | 248/27.1 X |
| 3,909,914 | 10/1975 | Symons | 312/263 X |
| 4,123,129 | 10/1978 | Butler | 312/111 X |
| 4,190,749 | 2/1980 | Erickson et al. | 248/27.1 X |
| 4,270,820 | 6/1981 | McMullan et al. | 312/242 |

FOREIGN PATENT DOCUMENTS

| 2856443 | 7/1980 | Fed. Rep. of Germany | 312/111 |
|---|---|---|---|
| 972215 | 9/1948 | France | 312/140 |
| 196935 | 7/1938 | Switzerland | 312/263 |

Primary Examiner—Victor N. Sakran
Assistant Examiner—Thomas A. Rendos
Attorney, Agent, or Firm—Eugene E. Renz, Jr.

[57] ABSTRACT

For the purpose of fastening instruments in an opening in a front panel or switchboard, connectors are provided which have tongue parts which are inserted from the rear into corresponding grooves along the side edges of the casing of each instrument. A cover plate projecting laterally beyond the casing abuts from the outside against the edge of the opening and the connectors press from the interior against the front panel or switchboard and pull the casing backwardly. The locking between the tongue parts and the grooves is effected by anchoring parts, preferably rows of teeth which are adapted to snap resiliently into one another and which act in the longitudinal direction.

17 Claims, 7 Drawing Figures

APPARATUS FOR FASTENING INSTRUMENTS IN A FRONT PANEL OR SWITCHBOARD

BACKGROUND OF THE INVENTION

The invention relates to an apparatus for fastening instruments, for example measuring and/or indicating instruments, in an opening in a front panel or switchboard, each instrument having a casing and a cover plate projecting laterally beyond the casing to abut against the outer side of the front panel or switchboard.

In known arrangements of this kind each instrument which is to be fastened always has its own opening in the front panel or switchboard, and screw connections or the like, requiring the use of tools, are used for fastening the instruments in the openings. In order to support the individual instrument casings, the openings provided for them must conform to certain minimum spacings. For the mounting of a number of electronic units and their indicator devices a relatively large expenditure of manufacturing effort and space is entailed in the production of the front panel or switchboard, together with considerable installation expense when fastening each individual casing on the front panel or switchboard.

It is an object of the invention to provide an improved apparatus of the kind described above, in which a firm fastening of a casing in an opening of this kind is made simply and substantially without the use of tools, and a plurality of instrument casings can be fastened to one another and in a single common opening to the front panel or switchboard.

SUMMARY OF THE INVENTION

According to the invention there is provided apparatus for fastening instruments, for example measuring and/or indicating instruments, in an opening in a front panel or switchboard, each instrument having a casing and a cover plate projecting laterally beyond the casing in order to abut against the outer side of the front panel or switchboard, wherein the casing is formed with grooves respectively on both sides of each side edge which extends at right angles to the cover plate, each groove is parallel to the said side edge, a tongue member on a common connector is adapted to be inserted into each of the two grooves near a side edge, and each groove and each tongue member has anchoring parts which on insertion are adapted to snap resiliently one into the other and which act in the longitudinal direction thereof, and each connector when inserted, bears against the inner side of the front panel or switchboard.

For fastening a casing in an opening, it is merely necessary to insert the casing from the outer side of the front panel until its cover plate abuts against the outer side of the front panel. On all four side edges two tongue members of four connectors are then inserted into the grooves and secured in the grooves by means of the interlocking anchoring parts in such a manner that the front ends of the connectors are pressed against the inner side of the front panel or switchboard. The casing can thus be rapidly fastened in to the opening without the use of a tool. The anchoring parts act in the longitudinal direction of the grooves and maintain this fastening as long as they are not intentionally detached by resilient unclipping whereby the casing is taken out of its position. The mounting and removal of the casing are thus made very simple.

If it is desired to fasten a plurality of instruments simultaneously in a single opening in a front panel or switchboard, two, three or four tongue parts, depending on the particular requirements, are provided in the corresponding positions on the connectors, and are inserted into the grooves in the respective adjoining casings and secured in that position. The respective cover plates of the various casings then do not lie against the outer side of the common opening on all sides, but only on one edge or on two edges. In this way adequate fastening of the casings to one another and to the edge of the opening is assured.

In a preferred embodiment of the apparatus the grooves extend over the entire length of the side edges and the tongue members are adapted to be inserted into the grooves from their rear end remote from the cover plate. In this embodiment therefore a plurality of casings can be disposed side-by-side and one above the other and inserted into a common opening. Thereupon it is only necessary to insert and secure the corresponding number of connectors from the rear end into the corresponding grooves in order to fasten the entire arrangement in the opening. Removal is equally rapid and simple.

The anchoring parts for fastening the tongue members in the grooves may consist of interengaging teeth in the grooves and on the tongue members respectively. The teeth may extend only over a portion situated near the rear end of the grooves and tongue members respectively. The toothed parts are pressed into one another because of the inherent resiliency of the tongue members and/or of the casing walls. In this case the toothed parts, for example interengaging rows of teeth, are preferably so directed that they reliably prevent the tongue members from slipping backwards out of the grooves. Although the insertion and resilient interengaging of the teeth are thus made very simple, good security against slipping out in the opposite direction is achieved. Only by deliberate manipulation of the resilient parts can the anchoring parts then be detached.

In the simplest form of construction each of the connectors has at least two arms which are disposed in an L-shape and parallel to the adjoining casing walls, and each of which carries a tongue member. This form of construction is suitable for fastening a single casing in an opening.

In another construction the tongue members are rigidly joined to a stem of the connector over the entire length of the connector with the exception of the elastically resilient end portions which carry the anchoring parts. Only the ends used for the elastic interengagement have spring properties, while the other parts of the connector are rigid and can thus form carrying parts for the fastening of the casing.

For the purpose of fastening two or more casings in a common opening, the connectors preferably have three arms which are disposed in a T-shape or four arms disposed in the form of a cross, each of these arms has a tongue member with an anchoring part whose width is at least twice the depth of the grooves and is adapted to be inserted into oppositely disposed grooves of two neighbouring casings. For grooves lying directly opposite one another in two neighbouring casings, therefore, only one common connector arm with a common tongue member has to be provided in each case.

The teeth may be provided on the side face of each groove which is remote from the respective neighbouring side edge of the casing, and the teeth on the elastically resilient end portions of the tongue members are prestressed against the teeth of the grooves when the connectors are in the inserted position.

If the connectors are for example made of elastic material, such as a plastics material or the like, the elastically resilient ends of the tongue members can be slightly curved outwardly in relation to a rectilinear extension of the other tongue member portions when they are in the unloaded state, that is to say the uninserted state, so that when they are inserted into the rectilinear grooves they are slightly prestressed and thus the anchoring portions of the tongue members and grooves are pressed against one another. For detachment the resilient ends must then be slightly pressed inwards and the connector pulled out towards the rear.

The resilient construction of the casing walls also permits the further advantageous utilization of these walls for the fastening of internal plates of the measuring or indicating instrument in the casing. To this end, projections and/or grooves may be provided on the inside surface of each casing, in or between which the edges of the plates of the measuring or indicating instrument can be resiliently clipped and thereby secured.

BRIEF DESCRIPTION OF THE DRAWINGS

Some embodiments of the invention will now be described, by way of example, with reference to the accompanying drawings, in which.

DESCRIPTION OF THE PREFERRED EMBODIMENTS

Figure 1:
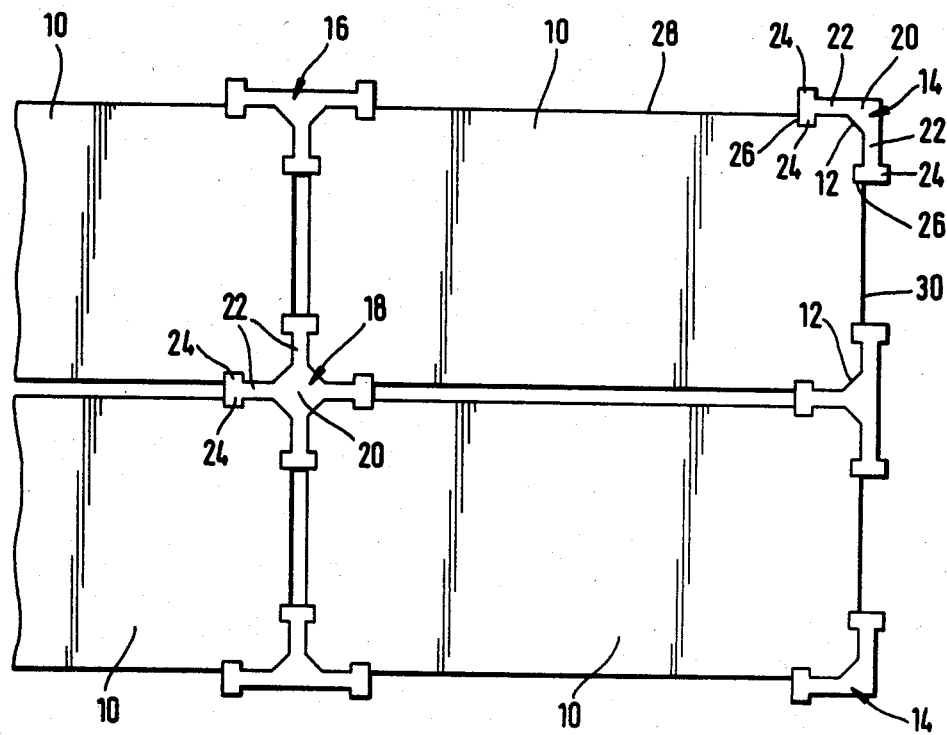
FIG. 1 is a diagrammatic elevation of a plurality of instrument casings joined together by connectors viewed from the rear of the casings.

In FIG. 1 four identical casings 10 of measuring or indicating instruments are shown side-by-side and one above the other, L-shaped connectors 14, T-shaped connectors 16, and cross-shaped connectors 18 being attached to the respective bevelled side edges 12 of the casings. The L-shaped connectors 14 have two arms 22 which project at right angles from a common stem part 20, and at the end of each arm 22 a tongue member 24 projects at right angles and in opposite directions from the arm 22. The tongue members 24 extend parallel to bevelled side edges 12 of the casing 10 and are inserted into corresponding grooves 26 in walls 28 and 30 of the casing. Apart from the number of arms, all the connectors 14, 16 and 18 are identical. The same reference numerals will therefore be used throughout for the stem parts 20, the arms 22 and the tongue members 24. The tongue members 24 are secured in the grooves 26 in a manner which will be explained below in greater detail, so that all the casings disposed side-by-side and one above the other are fastened together and, in a manner which will also be explained in detail below, in a common opening in a front panel or the like.

Figure 3:
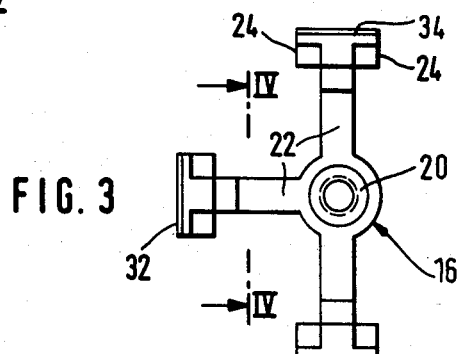
FIG. 3 is a front view of a three-armed T-shaped connector.
Figure 4:
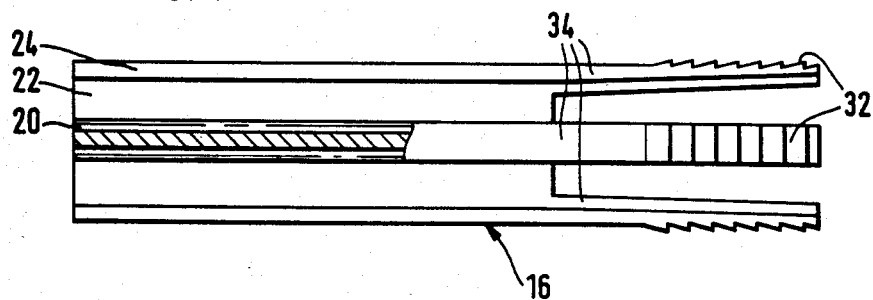
FIG. 4 is a section on the line IV—IV in FIG. 3.

The construction of the connectors shown in rear view in FIG. 1 is illustrated in FIGS. 3 and 4 with reference to a T-shaped three-armed connector 16. In the form of connector illustrated the anchoring parts consist of rows of teeth 32 which are formed on resilient end portions 34 of the tongue members, on the outer side facing away from the stem part 20. With the exception of the resilient end parts 34, the tongue members 24 are rigidly connected by means of the arms 22 to the stem part 20 of the connector 16.

Figure 2:
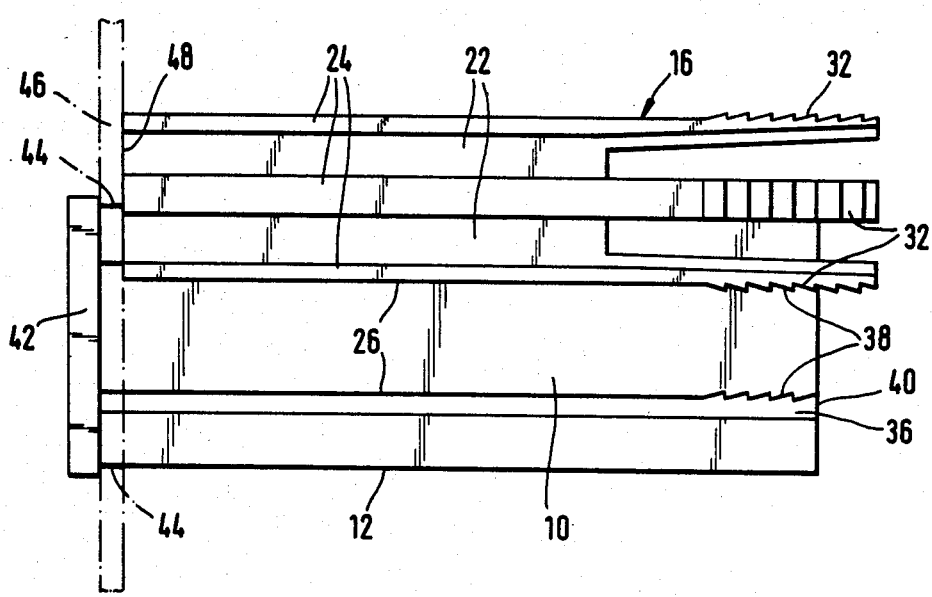
FIG. 2 is a diagrammatic side view of a casing inserted into an opening in a front panel and provided with an inserted connector.

From FIG. 2 it can be seen that the grooves 26 which extend longitudinally in the casing 10 also have rows of teeth 38 on their rear end portions 36, on the side surface facing away from the respective neighbouring side edge 12, which teeth 38 correspond to and cooperate with the teeth 32. Since the grooves 26 are open at their rear end 40, the tongue members 24 of the connector 16 can be pushed into the grooves from the rear until the teeth 32 and 38 engage resiliently in one another. The flanks of the teeth 32 and 38 are so directed that on insertion of the connector 16 the teeth slide easily over one another, but the connector 16 cannot slide out backwards without bending the resilient portions 34. This means that the forwardly directed flanks are flatter and the rearwardly directed flanks are steeper.

In the condition shown in FIG. 2 an instrument casing 10 with its cover plate 42 is inserted into an opening 44 in a front panel 46, which is shown in dash-dot lines, in such a manner that the edge of the cover plate 42 projects laterally beyond the casing 10 and abuts against the outer side of the front panel 46. The tongue members 24 of a connector 16 are inserted into two grooves 26 which lie on both sides of a side edge 12, which is not visible in FIG. 2, in such a manner that the complementary rows of teeth 32 and 38 engage in each other. The connector 16 is pushed forwardly until its front end 48 presses against the inner side of the front panel 46. The casing 10 is firmly secured by inserting identical connectors 16 or connectors 14 or 18 on the other side edges 12.

FIGS. 2 and 4 show that the resilient end portions 34 of the tongue members 24, before the connector 16 has been inserted, are inclined slightly outwards relative to a rectilinear extension of the front portions of the tongue members 24, so that when they are inserted into the rectilinear end portions of the grooves 26 they are prestressed, whereby the teeth 32 are pressed into the complementary teeth 38 on the side surfaces of the grooves 26. The separation of the teeth and the consequent sliding out of the connector 16 towards the rear are possible only when the end portions 34 which are inserted into the grooves 26, are bent inwardly and the teeth are thus intentionally separated.

Figure 5:
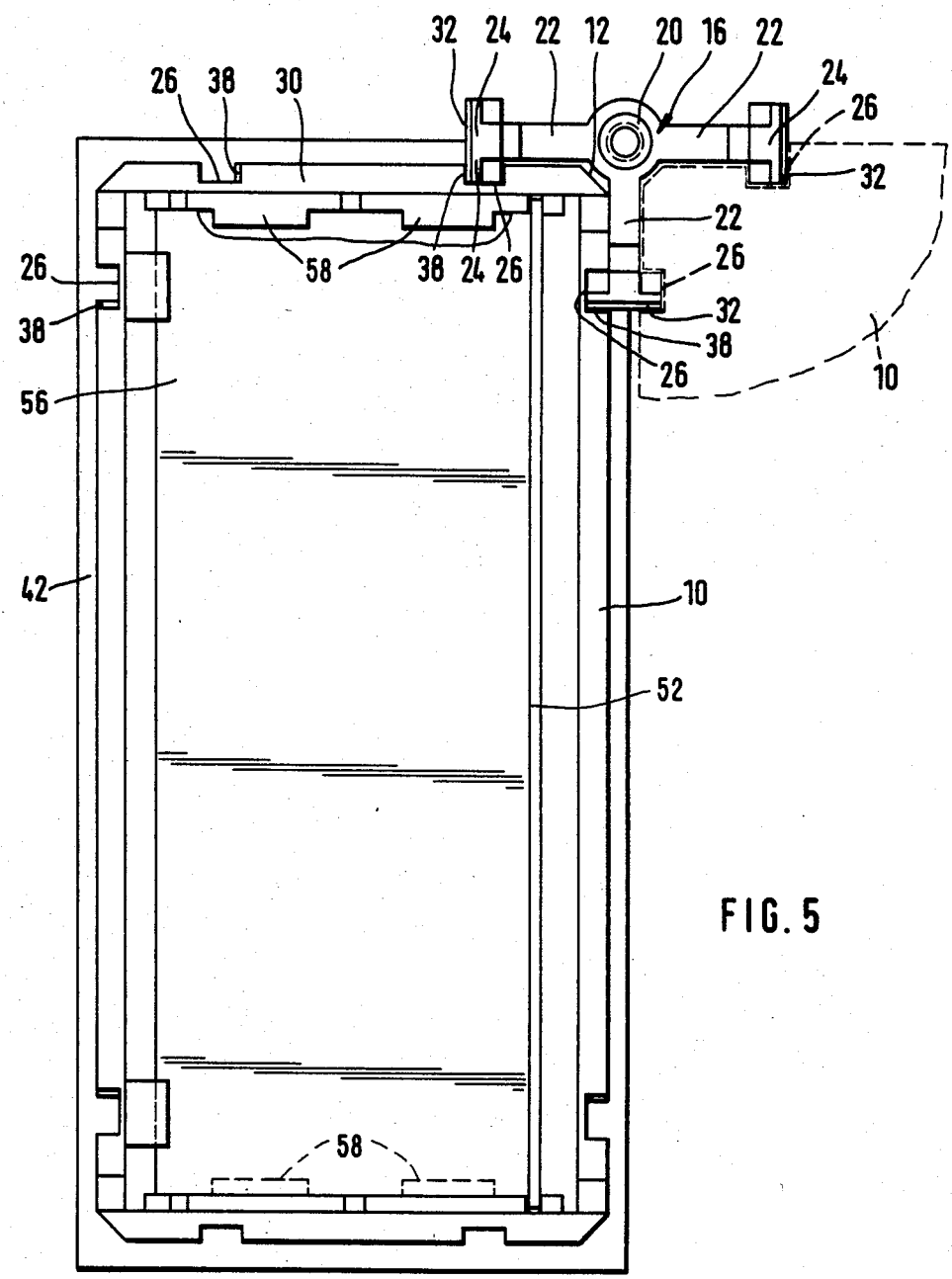
FIG. 5 is a diagrammatic rear view, corresponding to FIG. 1, of a casing with a cover plate and a three-armed connector, a plate clamped in the casing also being shown.
Figure 6:
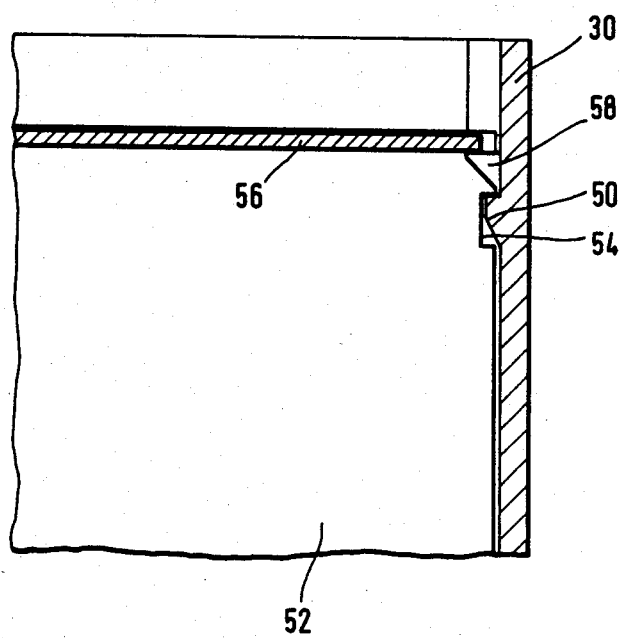
FIG. 6 shows diagrammatically a part of a casing shown in section in the longitudinal direction, with two plates at right angles clamped to one another; and, FIG. 7 is a view similar to FIG. 6 showing the relative position of the parts during assembly.

FIGS. 5 and 6 show a modified form of the present invention wherein the assembly includes internal plates 52, 56 of the measuring or indicating instrument mounted in the casing.

FIG. 5 shows in rather more detail than FIG. 1 a plan view of a connector 16 in position after insertion into four grooves 26 of two adjoining casings 10. The second casing 10 is indicated in broken lines. In the same way, two additional casings 10 can be mounted on the upper side of the connector 16.

FIGS. 5 and 6 show that a plurality of projections 50 and 58, offset relative to one another, are provided on the inside of the casing wall 30, between which projections the edge of a plate 56 of the unit contained in the casing 10 is clamped. Because of the elastically resilient construction of the casing wall 30, the edge of the plate can simply be snapped in between the projections 50 and 58 without special fastening means, such as screws or the like.

As shown in FIG. 6 provision is made for a plate 52, disposed at right angles to the plate 56, to be clipped, by means of its cutout 54, on the projection 50 of the resilient wall 30, and thus to be secured in the casing 30.

Figure 7:
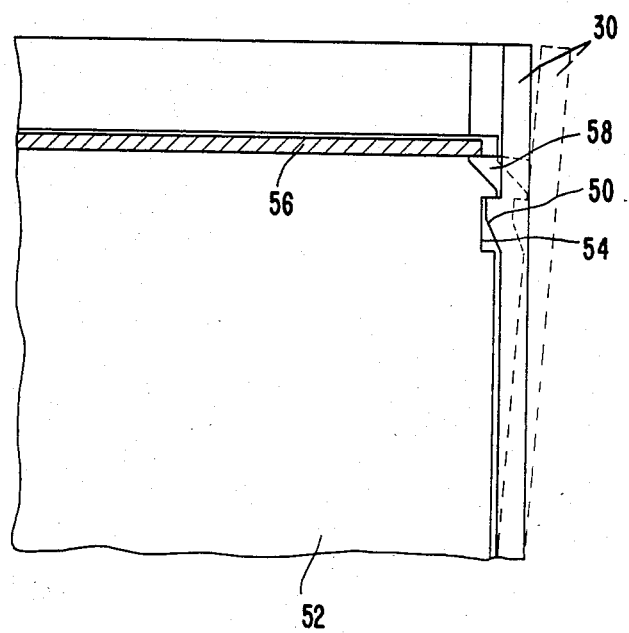

FIG. 7 illustrates the position of the parts during assembly of the plates 52, 56 into the casing. As illustrated therein, the plate 56 is pushed in together with the plate 52 and urges the projection 58 outwardly as shown in dotted lines until the plate 56 has passed the projection 58. Concurrently, plate 52 urges projection 50 outwardly as illustrated by the broken line position shown therein. The projection 50 snaps elastically back inwardly as soon as it registers with the cutout 54. This is possible in view of the resilient properties of the wall 30.

We claim:

1. Apparatus for fastening instruments in an opening in a front panel, each instrument having a casing and a cover plate projecting laterally beyond the casing in order to abut against the outer side of the front panel, said casing formed with grooves respectively on both sides of each side edge which extends at right angles to the cover plate, each groove being parallel to the said side edge, a tongue member on a common connector adapted to be inserted into each of the two grooves near a side edge, and each groove and each tongue member having anchoring parts which on insertion are adapted to snap resiliently one into the other and which act in the longitudinal direction thereof, and each connector, when inserted, bearing against the inner side of the front panel.

2. Apparatus according to claim 1, wherein the grooves extend over the entire length of the side edges, and wherein the tongue members are adapted to be inserted into the grooves from their rear end remote from the cover plate.

3. Apparatus according to claim 2, wherein the anchoring parts consist of interengaging teeth in the grooves and on the tongue members, which teeth extend only over a portion situated near the rear end of the grooves and the tongue members respectively.

4. Apparatus according to claim 1, wherein the anchoring parts consist of interengaging teeth in the grooves and on the tongue members respectively.

5. Apparatus according to claim 4, wherein the teeth extend only over a portion situated near the rear end of the grooves and tongue members respectively.

6. Apparatus according to claim 4, wherein the teeth are provided on the side face of each groove which is remote from the respective neighbouring side edge of the casing, and the teeth on the elastically resilient end portions of the tongue members are prestressed against the teeth of the grooves when the connectors are in the inserted position.

7. Apparatus according to claim 1, wherein the anchoring parts are pressed into one another through the inherent elastic resiliency of the tongue members.

8. Apparatus according to claim 7, wherein the tongue members are rigidly joined to a stem of the connector over the entire length of the connector with the exception of the elastically resilient end portions which carry the anchoring parts.

9. Apparatus according to claim 1, wherein the anchoring parts are so directed that they reliably prevent the tongue members from slipping backwardly out of the grooves.

10. Apparatus according to claim 1, wherein each of the connectors has at least two arms which are disposed in an L-shape and, in use, are parallel to the adjoining casing walls, and each arm carries a tongue member.

11. Apparatus according to claim 1, wherein said connector has three arms which are disposed in a T-shape, each of said arms having a tongue member with an anchoring part whose width is at least twice the depth of the grooves and is adapted to be inserted into oppositely disposed grooves in two neighboring casings.

12. Apparatus according to claim 1, including projections on the inner surface of each casing, between which the edges of plates of the instrument can be resiliently clipped and thereby secured.

13. Apparatus according to claim 1, wherein each of the connectors has at least two arms which are disposed in an L-shape and, in use, are parallel to the adjoining casing walls, and each arm carries a tongue member having a row of teeth for engaging with cooperating teeth in a groove formed in an instrument casing.

14. Apparatus according to claim 1, including connectors having three arms which are disposed in a T-shape, and each arm has a tongue member with an anchoring part whose width is at least twice the depth of the grooves in the casing, which anchoring part is formed with teeth which interengage with teeth in oppositely disposed grooves in two neighbouring casings.

15. Apparatus according to claim 1, including connectors having four arms disposed in the form of a cross, and each arm has a tongue member with an anchoring part whose width is at least twice the depth of the grooves in the casing, which anchoring part is formed with teeth which interengage with teeth in oppositely disposed grooves in two neighbouring casings.

16. Apparatus according to claim 1 wherein the anchoring parts are pressed into one another through the inherent elastic resiliency of the casing walls.

17. Apparatus according to claim 1 wherein said connector has four arms disposed in the form of a cross, each of said arms having a tongue member with an anchoring part whose width is at least twice the depth of the grooves and is adapted to be inserted into oppositely disposed grooves in two neighboring casings.

* * * * *